United States Patent

Varga

[11] Patent Number: 5,916,350
[45] Date of Patent: Jun. 29, 1999

[54] PISTON ROD BEARING ASSEMBLY OF RECIPROCATING PISTON ENGINE

[75] Inventor: John Maximillian Jules Varga, Halifax, United Kingdom

[73] Assignee: Carding Specialist Limited, Toronto, Canada

[21] Appl. No.: 08/875,126

[22] PCT Filed: Jan. 19, 1996

[86] PCT No.: PCT/GB96/00097

§ 371 Date: Nov. 6, 1997

§ 102(e) Date: Nov. 6, 1997

[87] PCT Pub. No.: WO96/22473

PCT Pub. Date: Jul. 25, 1996

[30] Foreign Application Priority Data

Jan. 19, 1995 [GB] United Kingdom ................. 9501080

[51] Int. Cl.⁶ ........................ F16J 15/18; F16C 32/00
[52] U.S. Cl. .............. 92/165 R; 92/168; 92/DIG. 2; 384/1
[58] Field of Search .................... 92/31, 32, 33, 92/165 PR, 165 R, 166, 168, 178, DIG. 1; 384/1, 49

[56] References Cited

U.S. PATENT DOCUMENTS

| | | | |
|---|---|---|---|
| 2,647,807 | 8/1953 | Brunstrum | 92/DIG. 1 X |
| 2,903,307 | 9/1959 | Peters et al. | 384/49 X |
| 3,762,781 | 10/1973 | Zeldman | |
| 3,992,122 | 11/1976 | Maxey | 384/49 X |
| 4,648,727 | 3/1987 | O'neil et al. | 384/49 |
| 4,657,412 | 4/1987 | McLarty et al. | 384/1 X |
| 4,717,265 | 1/1988 | Shioda et al. | 384/49 |
| 5,140,904 | 8/1992 | Schonlau | 92/27 |
| 5,141,337 | 8/1992 | Hanaway | |
| 5,145,259 | 9/1992 | Murano et al. | 384/1 |
| 5,199,345 | 4/1993 | Meier | 92/168 X |
| 5,456,160 | 10/1995 | Caldwell | 92/168 |
| 5,727,445 | 3/1998 | Sheldon | 92/31 X |
| 5,761,985 | 6/1998 | Stoll | 92/165 R X |

FOREIGN PATENT DOCUMENTS

| | | | |
|---|---|---|---|
| 782267 | 10/1972 | Belgium | |
| 1575079 | 7/1969 | France | |
| 31 46 849 C2 | 3/1984 | Germany | |
| 283855 | 10/1952 | Sweden | 384/48 |

OTHER PUBLICATIONS

Patent Abstracts of Japan, vol. 8, No. 276, M–346, abstract of JP,A, 59–147116 (Toyota Jidosha K.K.), Aug. 23, 1984 (8–23–1984).

Derwent's Abstract, No. 86–117696/18, week 8618, Abstract of SU,1183244 (Soyuztekhnopribor), Oct. 7, 1985 (10–07–1985).

*Primary Examiner*—John E. Ryznic
*Attorney, Agent, or Firm*—Workman, Nydegger & Seeley

[57] ABSTRACT

A bearing assembly for a piston rod of a linearly reciprocating piston type engine having a cylinder (11), a piston (12) movable axially in cylinder (11), at least one piston rod (13) secured to and projecting axially from one side of the piston to be received in a respective bearing assembly (17) mounted in a cover assembly at one end of the cylinder and which guides the movement of the piston/piston rod assembly, said bearing assembly comprising: an inner annular array of balls (18) which roll on the cylindrical outer surface of the piston rod (13) during its reciprocation, and housed in an annular space defined between the cylindrical outer surface of rod (13) and a sleeve (19); bearings (20) which rotatably mount sleeve (19); and means for rotating the sleeve (19) about the axis of the piston rod (13) so as to apply continuous rotation to the balls during each cycle of reciprocation of the piston rod and thereby enable a hydrodynamic lubrication of the bearing assembly.

15 Claims, 3 Drawing Sheets

PISTON ROD BEARING ASSEMBLY OF RECIPROCATING PISTON ENGINE

This invention relates to a bearing assembly for a piston rod of a linearly reciprocating piston type engine.

The type of linearly reciprocating piston engine with which the invention is concerned has a cylinder, a piston movable axially in said cylinder, a piston rod secured to and projecting from each side of the piston, said piston rod extending axially of the piston and being movable with the piston in a fixed plane parallel to the axis of the cylinder, a cover assembly at one end of the cylinder and facing said one side of the piston, and an opening formed in said cover assembly through which the piston rod extends.

Usually, the piston will have a pair of piston rods, each extending axially outwardly of a respective one of the opposed working faces of the piston.

The invention has been developed primarily in connection with a reciprocating piston type compressor having a "floating" piston (in which the piston does not rely upon contact with the wall of the cylinder to guide its linear reciprocation). However, it should be understood that the invention may be applied to other forms of reciprocating piston type engine which require mechanical power input in order to do mechanical work e.g. to pressurise a working fluid as in a pump or compressor, or which are energised by a pressurised working fluid in order to generate mechanical power e.g. an air motor.

There are many applications in industry in which a supply of compressed air is required e.g. to operate pneumatic tools in an assembly line, or in a textile mill, and in recent years rotary compressors (screw compressors, vane compressors or centrifugal compressors) have been considered to be the sole practical and reliable way of supplying compressed air.

The invention seeks to reverse this trend, and to overcome perceived drawbacks to the use of linearly reciprocating piston type compressors.

It is of course known to mount a linearly displaceable shaft in a bearing assembly, in which the shaft is taken through a circular central aperture of a ball bearing, and the balls engage the outer periphery of the shaft and each ball rotates about its own axis as the shaft moves back and forwards relative to the ball bearing during each cycle of operation.

The balls are arranged in an annular array between two coaxial annular surfaces, in which the inner annular surface is formed by the cylindrical periphery of the shaft and the outer annular surface is formed by a fixed sleeve or bush which is normally rigidly secured against the internal wall of the opening in which the bearing is mounted.

Grease or oil is normally contained within the annular space in which the balls are arranged, and lubricate the rotation of the balls. While the balls are rotating, a film of lubricant builds-up at the interfaces between the instantaneous surfaces of contact of the balls and the inner and outer annular surfaces. However, each time the shaft reverses its linear movement, there is a "dwell period" in which the rotation of the balls is arrested (prior to rotation in a reverse direction) and this tends to break down the lubricant film and allow direct metal to metal contact which is a source of wear which, over a period of time, results in unacceptable wear and breakdown, and generation of undesired clearances caused by wear.

Therefore, while it would be particularly suitable for a "floating piston" type of compressor to provide rigid guidance for the movement of the piston rod in an end cover of the cylinder via a bearing assembly, (known for other uses in guiding linear movement as described above), this would not be suitable for such a use because of wear problems in the balls, and the need to provide rigid guidance by the bearing assembly to the piston/piston rod assembly.

Accordingly, in one aspect the invention seeks, by simple means, to improve the lubrication of the bearings in the bearing assembly for a piston rod of a reciprocating piston type of engine of the type defined above.

According to one aspect of the invention there is provided a linearly reciprocating piston engine comprising:

a cylinder;

a piston reciprocatable axially in said cylinder;

a piston rod secured to and projecting from each side of the piston, said piston rod extending parallel to the axis of the piston and being movable with the piston in a fixed plane parallel to the axis of the cylinder;

a cover assembly at one end of the cylinder and facing said one side of the piston;

an opening formed in said cover assembly through which the piston rod extends; and, a bearing assembly mounted on the cover assembly and arranged to guide the linear reciprocating movement of the piston rod, said bearing assembly comprising an annular array of balls surrounding and making rolling contact with the cylindrical periphery of the piston rod by rotating about axes perpendicular to the axis of the reciprocating rod, and a housing in which the balls are received; and, means for applying rotation to the balls about respective axes extending generally parallel to the axis of the piston rod, during each cycle of reciprocation of the piston rod.

Thus, in use, the balls undergo pure rolling action (substantially without sliding) in that they rotate about respective axes extending perpendicular to the axis of the piston rod, by reason of linear reciprocation of the piston rod, but also carry out further rotation about axes extending parallel to the axis of the piston rod. Therefore, even when the rod is reversing its reciprocation (which in known constructions would arrest the rotation of the balls), the balls continue to rotate about their axes which extend parallel to the rod axis (under action of said rotation applying means) so that lubrication of the balls can be maintained at all stages of reciprocation of the piston rod.

Any suitable means may be used to apply rotation to the balls, and which may comprise means to apply intermittent, or continuous rotation to the piston, or the piston rod. However, in a preferred embodiment, the bearing assembly comprises an annular array of balls surrounding and making contact with the cylindrical periphery of the piston rod; a sleeve radially spaced from the axis of the piston rod to define an annular space in which the array of balls is housed; means rotatably mounting the sleeve in the opening in the cover; and means for applying rotation to the sleeve about the axis of the piston rod during linear reciprocation of the latter.

Therefore, in the preferred embodiment of linearly reciprocating piston engine according to the invention, during operation the sleeve is rotated while the piston rod carries out backwards and forwards movement during each cycle of operation, and the rotation of the sleeve applies rotation to the balls, even when the piston rod is reversing its direction of reciprocation, (which in known constructions of reciprocating shafts normally arrests the rotation of the balls and gives rise to metal to metal contact).

By rotating the balls during operation, grease or oil provided as lubricant can maintain a protective lubricant film between the interfaces of both the inner and outer annular surfaces on which the balls rotate, thereby reducing wear, and providing more reliable operation.

The means by which the sleeve is rotatably mounted in the cover opening through which the piston rod extends may take any convenient form, which may be, for example, a further annular array of bearing balls. However, other arrangements may be provided, which allows the sleeve to rotate about the axis of the piston rod during operation.

Preferably, the invention is applied to a reciprocating piston type compressor having a "floating piston", and which will have a pair of oppositely projecting piston rods, each secured to a respective one of the opposed working faces of the piston, and extending through a mounting opening in a corresponding cover end plate of the housing.

The piston rods guide the movement of the piston so that the piston does not normally engage the side wall of the cylinder, which avoids necessity for piston seals, and provides substantially friction-free movement of the piston. A small proportion of gas can leak from one side of the piston to the other side (via the radial clearance between piston and cylinder wall), but this can be tolerated for many applications in view of the considerably enhanced service life and reduced maintenance costs of a friction-free movement of the piston and absence of piston seals.

However, according to a second aspect of the invention, which is concerned exclusively with a floating piston type of reciprocating piston type of compressor, there is provided:

a reciprocating piston type compressor having a cylinder, a piston mounted for linear reciprocation in said cylinder substantially without guidance of sliding contact with the inner wall of the cylinder, piston rod rigidly secured to each side of the piston, and a bearing assembly provided at one end of said cylinder and which receives said piston rod so as to guide the reciprocating movement of the piston, in which the balls of the bearing assembly make rolling contact with the cylindrical surface of the piston rod by simultaneous rotation linearly and circumferentially with respect to the rod.

Preferred embodiments of the invention will now be described in detail, by way of example only, with reference to the accompanying drawings, in which.

Figure 1:
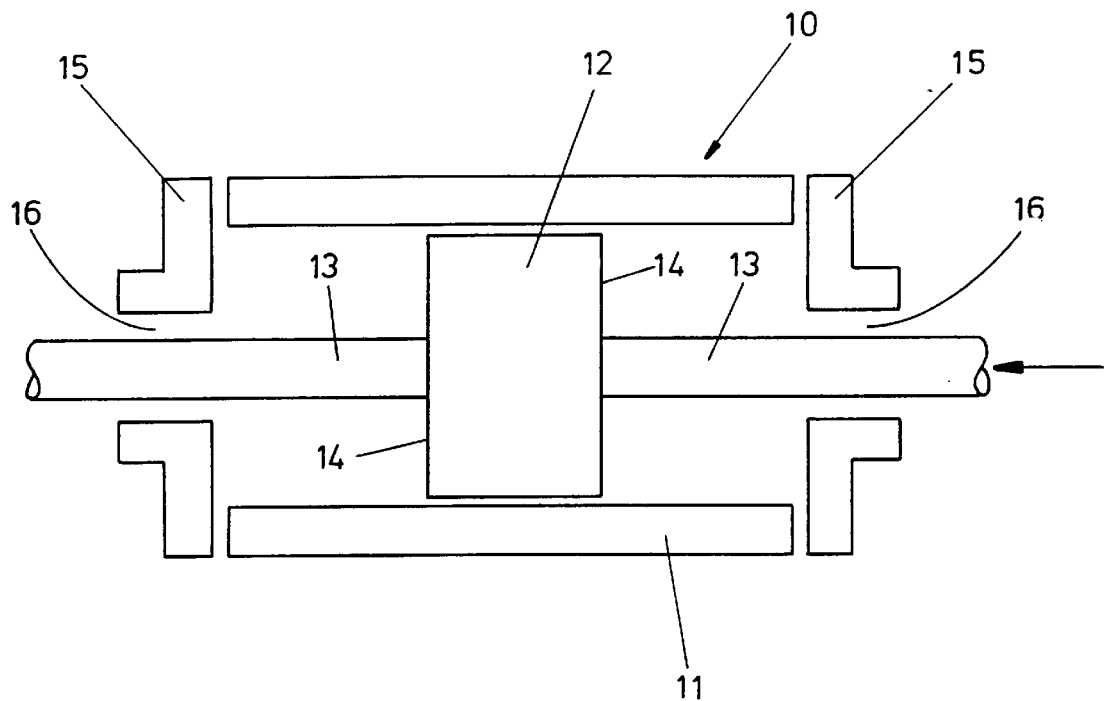
FIG. 1 is a schematic illustration of a linearly reciprocating piston type engine to which the invention may be applied in which ball bearing housings through which the piston rods extend are omitted for clarity.
Figure 2:
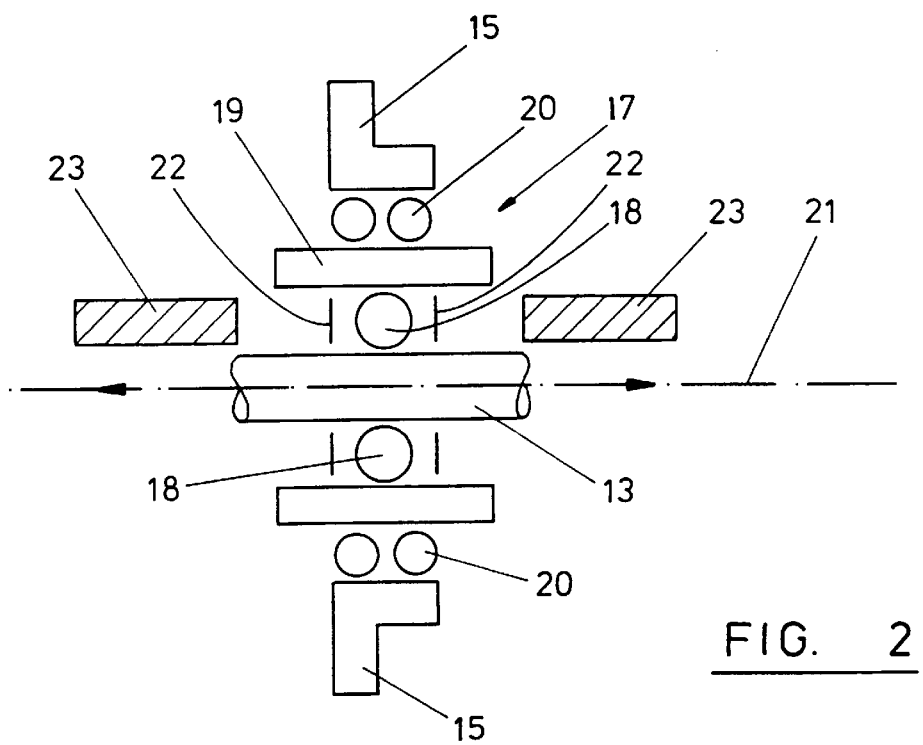
FIG. 2 is a schematic illustration of one of the bearing housings.

Referring now to FIGS. 1 and 2 of the drawings, there will be described a linearly reciprocating piston engine (having a "floating piston") which is intended primarily for use as a high pressure or low pressure air compressor. The engine is designated generally by reference 10 and has a cylinder 11, a "floating" piston 12 movable axially in the cylinder 11, and at least one piston rod secured to and projecting axially from one side of the piston. However, in practice, a pair of oppositely extending piston rods 13 will usually be provided, each being secured to and projecting from a respective one of the two opposed working sides or faces 14 of the piston.

Each piston rod 13 extends axially of the piston and is movable with the piston in a fixed plane parallel to the axis of the cylinder, and when the rods 13 are centrally mounted, as shown, this plane of movement will contain the longitudinal axis of the cylinder 11. Piston rods 13 are rigidly secured to the piston 12, so as to provide guidance for the movement of the piston 12 without need to engage the wall of cylinder 11.

A cover assembly 15 closes each end of the cylinder, and each faces a respective one of the opposed sides 14 of the piston. Further, as shown in FIG. 1, a mounting opening 16 is formed in each cover assembly 15 through which a respective piston rod 13 extends (cover assembly 15 is shown schematically only in FIGS. 1 and 2, and preferred embodiments are shown in more detail in FIGS. 3 to 6)

A respective bearing assembly, shown by reference 17 in FIG. 2, is mounted in each mounting opening 16 and defines a cylindrical bearing passage which rotatably receives and which guides the movement of the piston/piston rod assembly, and comprises an inner annular array of balls 18 (of one or more rows) which roll on the cylindrical outer surface of the piston rod i.e. linearly with respect of the rod 13 during its reciprocation, and which are housed in an annular space defined between the cylindrical outer surface of each rod 13 and a bearing housing formed by a sleeve or bush 19. Bush 19 is rotatably mounted in opening 16 in cover 15 by any suitable rotary support, which is shown schematically by two outer annular arrays of bearings 20. The bearings 20 also prevent the bush 19 from rocking during reciprocation of rod 13. Also, means (not shown) locates the bush 19 against axial displacement. A rigid assembly is obtained by interference fit in the opening 16 to provide radial loading of all engaging parts, and thereby pre-load the balls 18 and 20, to minimise radial movement of piston rod 13 and piston 12 when a load is applied. This is generally referred to in engineering terms as "rigidifying" a bearing.

For example, a 0.002 inch total interference of a full complement of 20 mm balls on a 6 inch diameter piston rod gives a degree of rigidity to the assembly, such that a 100 lb radial load gives a deflection of the rod 13 relative to the sleeve 19 of 0.00007 inches. The bearings 20, which have also to be pre-loaded to rigidify the sleeve 19 relative to housing 15. As the sleeve 19 does not reciprocate relative to housing 15, the bearings 20 can be deep grooved balls, roller bearings, or a pair of opposed taper roller bearings, amongst other arrangements.

Balls 18 may be "caged", as shown schematically by reference 22, to be retained against relative axial and peripheral displacement. Stops 23 limit the axial movement of balls 18, and also form a means of aligning the balls at the end of each reciprocation of the piston 12 (if cage 22 is omitted). FIG. 2 shows a single set of balls 18, but it should of course be understood that one or more rows of balls may be provided (whether caged or uncaged).

Grease or oil will be contained in the annular space in which the bearings 18 are housed, and this provides lubrication between the instantaneous contact interfaces between the rotating balls 18 and the cylindrical surface of rod 13 (or a wear sleeve mounted on rod 13) and the cylindrical inner wall of bush 19. Linear reciprocation of the piston rod 13 causes the balls 18 to rotate about their axes, and thereby guide in a smooth and low friction manner the axial reciprocation of the piston rod 13.

However, to minimise risk of metal to metal contact taking place between the surfaces of the balls 18 and adjoining contact surfaces whenever the rod 13 reaches the end of its linear movement in one direction, and then carries out reverse linear movement, an improved means is provided to maintain lubrication of the contact surfaces at this critical point in each linear reciprocating cycle. As is well known, a hydrodynamic lubricating effect is maintained for as long as the balls 18 are rotating at a sufficient speed, and the invention provides a means whereby the balls 18 can be caused to continue to rotate, even at the critical point of reversal of linear movement of the piston rod 13. This arrangement causes the balls to roll circumferentially with respect to the surface of the rod i.e. each ball rotates about an axis which is parallel to the axis of the rod, simultaneously with linear rolling along the length of the rod.

To this end, bush 19 is rotatably mounted in the mounting opening 16, and in addition means is provided (not shown) to apply continuous rotation to the bush 19 about the axis 21 of the piston rod 13. The balls therefore continue to rotate, at all stages during the linear reciprocation of the piston rods 13, and this provides a hydrodynamic lubricant film which builds up at the contact interfaces, and which gives a hydrostatic lubricating effect. The speed necessary of the rotation can be theoretically determined using the well-known Reynolds equations.

The combined rotations applied to each ball (by reciprocation of rod 13 and rotation of sleeve 19) means that the risk of localised wear on any parts of surfaces of rod 13 and sleeve 19 is much reduced. The angular rotation of the sleeve is such that, when combined with the reciprocation of the piston rod, the balls never repeat their paths; that is, ideally the ratio of the magnitude of the rotation to the given reciprocation is irrational. The whole bearing surface is therefore covered by the paths of the balls as a result of this combined rotation and reciprocation.

In a typical arrangement having a sleeve diameter of about 6 inch and ball diameter of ½ inch, and with a lubricant having a viscosity of about 80 centistokes, 100 lb radial loading, and linear speed of piston rod of about 5 feet per second, a minimum speed of rotation of sleeve 19 of about 100–200 rpm is suitable.

Theoretically, it may be sufficient for the bush 19 to be rotated whenever the piston rod 13 is approaching the end of its linear movement in one direction and/or is commencing its return path of movement, but in practice it will be generally more convenient to provide a more continuous rotary drive to bush 19 during operation of the engine.

When the engine 10 is used as an air compressor, suitable seals will be provided to provide some form of sealing to the mounting assembly of each piston rod 13, though in the case of a compressor a limited amount of air leakage through opening 16 can be tolerated. However, axially outwardly of the bearing assembly, a stepped arrangement (not shown) of cover 15 may approach the surface of rod 13 more closely to provide improved sealing. Suitable inlet and outlet valves will be provided (not shown) to control induction of air to be compressed during the induction stroke, and exhaust of compressed air during the compression stroke. Preferably, the engine operates as a double acting cylinder.

Evidently, the novel aspects of the bearing assembly disclosed herein (which are particularly suitable in providing substantially wear-free guidance of a floating area-sealed piston of a compressor) may be applied in other types of linearly reciprocating piston engines or mechanisms, including air motors. The guiding of a cylindrical shaft by balls, where an intermediate sleeve ensures that the balls rotate continuously, can of course be applied to any oscillating mechanism where linear ball bearings are normally called for.

The preferred embodiment has a bearing assembly in which the sleeve 19 forms a housing in which the balls 20 are received, and which applies rotation to the balls about axes extending parallel to the axis of the piston rod 13 (whereas linear reciprocation of the rod rotates the balls about axes which extend perpendicular to the axis of the rod).

However, other means (see FIGS. 5 and 6) may be employed to apply the same rotation to the balls as provided by the sleeve, including means to apply rotation to: (a) the piston rod; or (b) a unitary assembly of piston and piston rod.

The preferred embodiment of the invention provides an oil-free, floating piston type of reciprocating compressor working at pressures for industrial usage (up to 9 atmospheres). It has the advantage of high efficiency, both when compressing and when running unloaded. There is no wear between piston and cylinder, and low maintenance by reason of absence of piston seals. Further, the bearing assemblies provide much reduced friction and wear. The simplicity of design, reduced wear, and reduction of friction enable the compressor to be competitively priced relative to rotary compressors.

FIGS. 1 and 2 comprise a schematic illustration of a general type of linearly reciprocating piston type of engine to which the invention may be applied, and description will now be made of preferred embodiments, shown in more detail in FIGS. 3 to 6 of the drawings.

Figure 3:
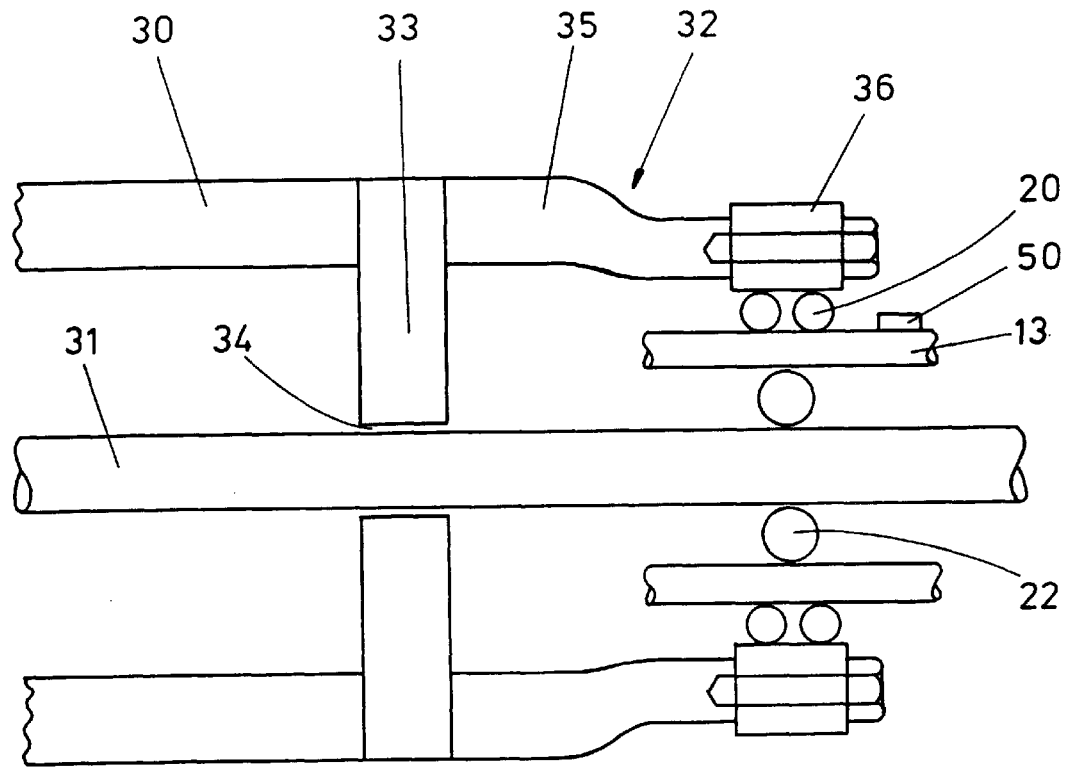
FIG. 3 is a schematic illustration, showing in more detail a preferred cylinder end cover assembly for use with a linearly reciprocating piston type engine according to the invention.

In FIG. 3, there is shown one end of a cylinder 30 of a reciprocating piston type engine, and having a piston rod 31 which is guided to carry out linear reciprocation in a respective bering assembly mounted at one end of the cylinder 30, and thereby to provide radial location of the piston (not shown) coupled with the piston rod 31. A cover assembly, designated generally by reference 32, is provided at one end of the cylinder 30, and comprises an end plate or cover 33 which closes one end of the cylinder 30 and defines a aperture 34 through which piston rod 31 extends, and a mounting portion 35 is connected to end cover plate 33 and projects generally axially there from and away from cylinder 30. Mounting portion 35 provides a mounting on which bearing assembly 36 is mounted. Therefore, the components 33, 35 and 36 generally correspond with the components illustrated schematically in FIGS. 1 and 2 and designated by references 15 and 17.

Figure 4:
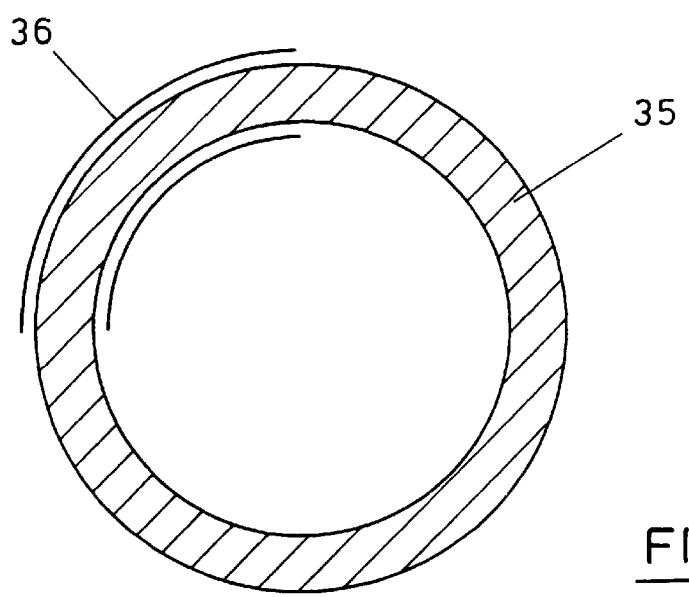
FIG. 4 is an end view corresponding to FIG. 3.

As shown in FIGS. 3 and 4, the cover 33 comprises an end plate which substantially closes the end of the cylinder 30, and therefore, if desired, the major part of the sealing of the piston rod 31 may be achieved by the manner by which it is taken through end plate 33. Mounting portion 35, in the illustrated arrangement, forms a cover member which surrounds the piston rod 31, and takes the form of a dome or bell shaped casting. A belt drive shown schematically by reference 50 in FIG. 3 may apply rotation (continuously or intermittently) to the sleeve 13.

Figure 5:
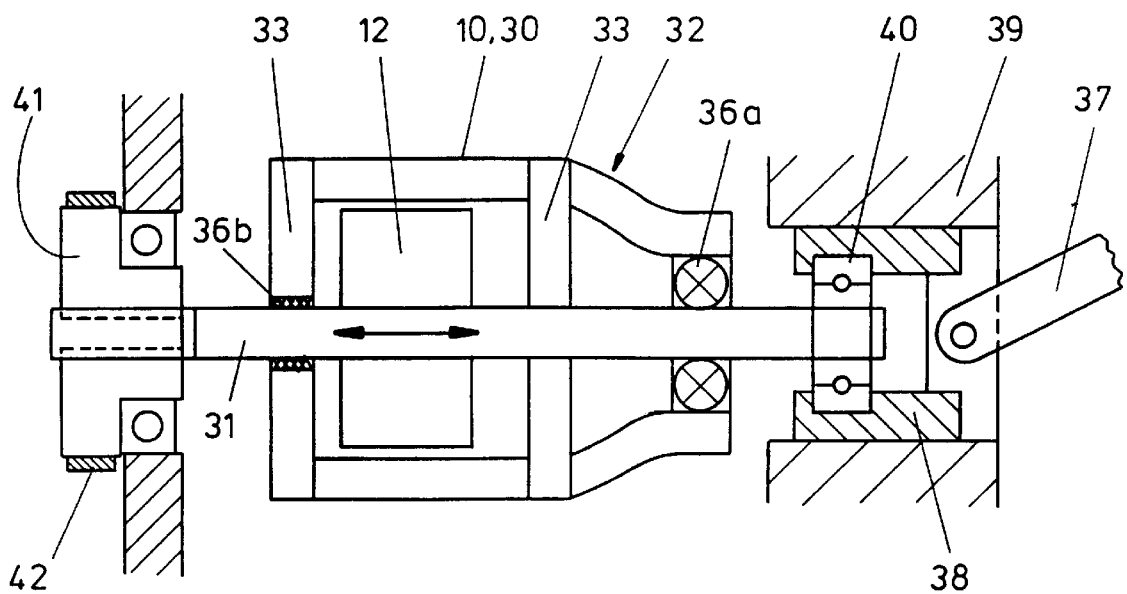
FIG. 5 is a schematic view, in more detail, of an alternative means for applying rotation to the balls of the bearing assembly, in a further embodiment of the invention.
Figure 6:
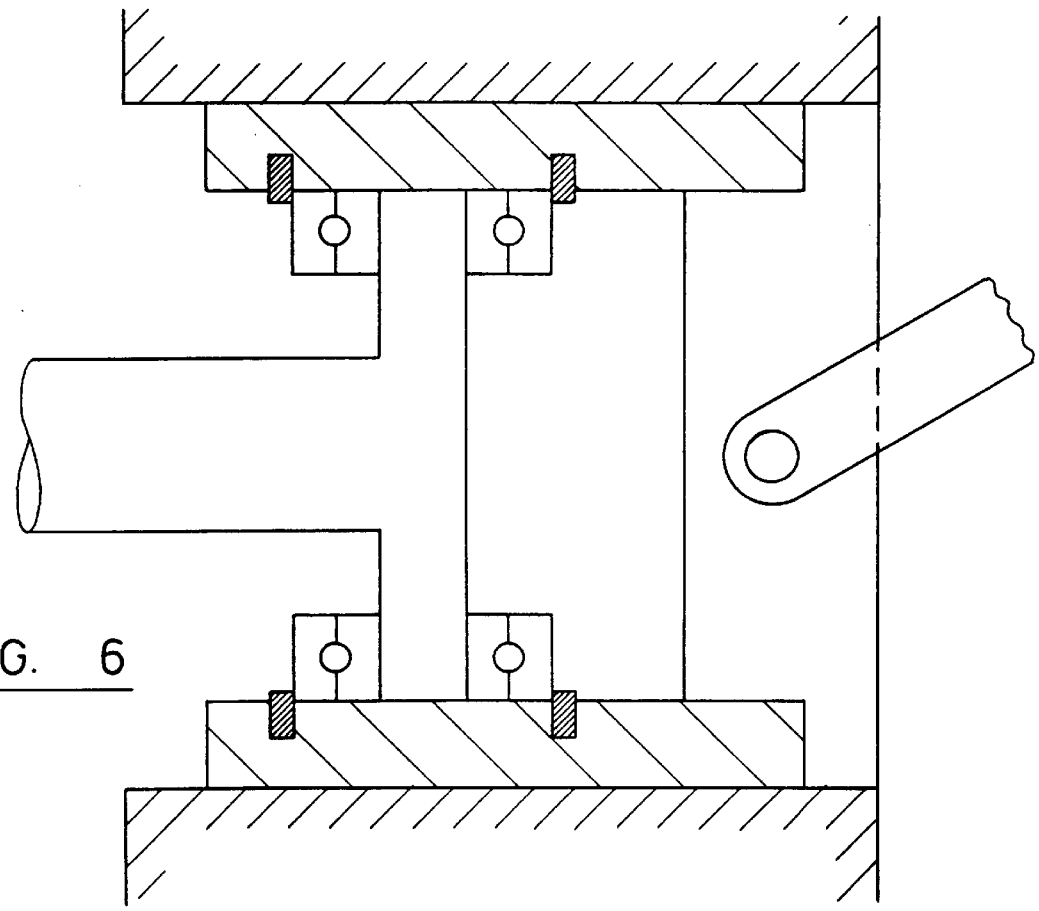
FIG. 6 is an enlarged detail view corresponding to FIG. 5.

Referring now to FIGS. 5 and 6, this shows in more detail one preferred arrangement for applying continuous rotation to the balls (36a and 36b) of the ball bearing assembly (but omitting sleeve 19 and balls 20 of FIG. 2) in which the piston rod is mounted for linear reciprocating movement. Parts corresponding with those already described are given the same reference numerals, and will not be described in detail again.

Piston 12 is mounted on piston rod 31, and which is taken through cover end plate 33 provided one at each end of the cylinder, and the means employed to apply continuous rotation to the balls of the bearing assembly 36 comprises a rotary drive applied to one end of piston rod 31. Therefore, as shown in FIG. 5, linear reciprocation is applied to piston rod 31 via a crank mechanism (not shown) having a connecting rod 37 coupled with a slide 38 mounted in a cross head 39, and in which the slide 38 carries a thrust race 40 mounted on a projecting end of piston rod 31.

The opposite end of the piston rod 31 carries a pulley 41 which is mounted on a splined extension of the piston rod 31 to provide a rotary coupling there between, but which permits relative axial movement. A belt 42 is driven from any suitable rotary power source (not shown) in order to apply continuous rotation to pulley 41, and thence to piston rod 31 and piston 12, and throughout the linear reciprocation of the piston rod 31. The contacts between the piston rod 31 and the balls of the ball bearing assembly 36 ensures that the balls are continuously rotated, even when the piston rod 31 reaches each end position of its linear reciprocation, which is a "dwell" period in which its motion is arrested prior to resuming linear movement in the opposite direction.

FIG. 6 is an enlarged view showing in more detail the way in which linear reciprocating motion is applied to the piston rod 31 via the drive mechanism.

I claim:

1. A linear bearing assembly comprising:
   an annular array of balls receiving a linearly reciprocatable rod;
   a sleeve radially spaced from the axis of the rod to define an annular space in which the array of balls is housed; and
   means for applying rotation to the sleeve about said axis in order to rotate the balls.

2. A bearing assembly according to claim 1, and arranged so that the balls can roll on the cylindrical surface of the rod to carry out linear movement and also circumferential movement relative thereto.

3. A linear bearing assembly comprising:
   an annular array of balls receiving a linearly movable rod;
   a housing in which the balls are received; and
   means for applying rotation to the balls continuously about respective axes extending generally parallel to the axis of the rod, and at such a speed that hydrodynamic lubrication of the bearing surfaces can be maintained when lubricant is present in the bearing assembly.

4. A linearly reciprocating piston engine comprising:
   a cylinder;
   a piston movable axially in said cylinder;
   a piston rod secured to and projecting from one side of the piston, said piston rod extending parallel to the axis of the piston and being movable with the piston in a fixed plane parallel to the axis of the cylinder;
   a cover assembly at one end of the cylinder and facing said one side of the piston;
   an opening formed in said cover assembly through which the piston rod extends; and,
   a bearing assembly mounted on said cover assembly and arranged to guide the linear reciprocating movement of the piston rod, said bearing assembly comprising an annular array of balls surrounding and making contact with the cylindrical periphery of the piston rod, and a housing in which the balls are received; and,
   means for applying rotation to the balls about respective axes extending generally parallel to the axis of the piston rod, during at least part of the cycle of reciprocating movement of the rod.

5. An engine according to claim 4, and arranged so that the balls can roll on the cylindrical surface of the rod to move linearly and also circumferentially relative to the rod.

6. An engine according to claim 5, including means for rotating said piston rod, in order to rotate the balls about said axes extending parallel to the axis of the piston rod.

7. An engine according to claim 6, in which the piston is linearly reciprocatable in said cylinder substantially without guidance by sliding contact with the inner wall of the cylinder, and a pair of oppositely projecting piston rods is secured one each to a respective one of the opposed working faces of the piston, and extends through a mounting opening in a corresponding cover end plate of the housing and is mounted therein via a respective bearing assembly.

8. An engine according to claim 6, in which said annular array of balls surrounding and making contact with the cylindrical periphery of the piston rod is retained against axial and/or peripheral relative displacement via a cage.

9. An engine according to claim 6, in which the annular array of balls is uncaged, and has its relative axial movement limited between a pair of axially displaced end stops.

10. An engine according to claim 5, in which the cover assembly comprises a cover closing one end of the cylinder and defining an aperture through which the piston rod extends, and a mounting portion connected to the cover and projecting therefrom, and on which said bearing assembly is mounted.

11. An engine according to claim 4, in which said means for applying rotation to the balls about respective axes extending generally parallel to the axis of the piston rod is operative to apply discontinuous rotation, but sufficient that substantially the entire cylindrical surface of the rod is engaged by the balls after a large number of reciprocations of the rod.

12. A linearly reciprocating piston engine comprising:
    a cylinder;
    a piston movable axially in said cylinder;
    a piston rod secured to and projecting from one side of the piston, said piston rod extending parallel to the axis of the piston and being movable with the piston in a fixed plane parallel to the axis of the cylinder;
    a cover assembly at one end of the cylinder and facing said one side of the piston;
    an opening formed in said cover assembly through which the piston rod extends; and,
    a bearing assembly mounted in said cover assembly and arranged to guide the linear reciprocating movement of the piston rod:
    in which the bearing assembly comprises an annular array of balls surrounding and making contact with the cylindrical periphery of the piston rod; a sleeve radially spaced from the axis of the piston rod to define an annular space in which the array of balls is housed; means rotatably mounting the sleeve in the cover assembly; and means for applying rotation to the sleeve about the axis of the piston rod during linear reciprocation of the latter in order to rotate the balls.

13. An engine according to claim 12, in which said means by which the sleeve is rotatably mounted in the cover opening comprises a further annular array of anti-friction bearings.

14. An engine according to claim 12, including indexing means for applying discontinuous rotation to said sleeve, but such that substantially the entire cylindrical surface of the rod is engaged by the balls after a large number of reciprocations of the rod.

15. A reciprocating piston type of compressor which comprises:
    a cylinder, a piston mounted for linear reciprocation in said cylinder substantially without guidance by sliding contact with the inner wall of the cylinder, a piston rod rigidly secured to each side of the piston, and a respective ball bearing assembly provided in one end of said cylinder and which receives each piston rod so as to guide the reciprocating movement of the piston, and means for applying continuous rotation to the balls during each cycle of reciprocation of the piston rod so as to maintain a hydrodynamic lubricating effect.

* * * * *